United States Patent Office 2,927,122
Patented Mar. 1, 1960

2,927,122

DERIVATIVES OF PHOSPHORIC ACID AND PROCESS FOR THE PRODUCTION THEREOF

Gerhard Schrader, Opladen, Germany, assignor to Farbenfabriken Bayer Aktiengesellschaft, Leverkusen, Germany, a corporation of Germany No Drawing. Application June 14, 1955
Serial No. 515,525

1 Claim. (Cl. 260—461)

The present invention relates to new and useful organic phosphate compounds and to methods of preparing the same. This invention includes more particularly new improvements in procedures of producing these novel phosphates.

The many uses to which phosphoric acid derivatives have been put in recent years, e.g., plasticizers and insecticides, have created considerable demand for these compounds. Accordingly, an extensive amount of work has been done to improve existing procedures for their preparation. This is particularly true in the field of phosphoric acid esters whose valuable properties for the use as insecticides have greatly increased the demand for this type of product.

Notwithstanding the large amount of work done to improve existing methods for the manufacture of phosphoric acid esters, serious problems still exist in obtaining products of substantially good insecticidal properties and in obtaining these in high yield.

A principal object of the present invention is the provision of novel and useful insecticides. A further object is the provision of new improvements in the manufacture of vinyl-phosphates.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished, according to the present invention, in the process for manufacture of a vinyl-phosphate having the following general formula:

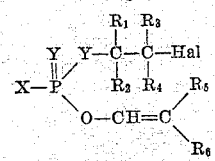

In this formula, X stands for an alkoxy, aryloxy, alkylmercapto, arylmercapto or substituted amino group, Y represents O or S, $R_1$ thru $R_4$ stand for hydrogen, alkyl or aryl radicals and $R_5$, $R_6$ are hydrogen, alkyl or halogen radicals.

It is known that phosphorus trichloride readily reacts with ethylene glycol to form glycol-phosphorus chloride (Chemical Abstracts vol. 42 (1948), page 2924/b):

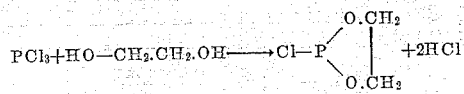

In the glycol-phosphorous chloride obtained in this manner, it is readily possible for the last chlorine atom to be replaced by the radical of an alcohol, the radical of a phenol, the radical of an aliphatic or aromatic mercaptan or the radical of a secondary amine. In this way, there are obtained compounds of the general formula

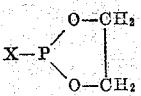

in which X stands for alkoxy, aryloxy, alkylmercapto, arylmercapto or a substituted amino group. These compounds are obtainable by known methods for the preparation of trialkylphosphites from dialkyl-chlorophosphites.

It has now been found that compounds of the general formula

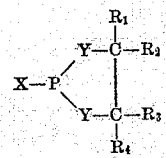

in which X stands for the above mentioned radicals, Y stands for O or S, and $R_1$ thru $R_4$ may be hydrogen, alkyl or aryl radicals, react with α-halogenated aldehydes to form vinyl esters of phosphoric acid derivatives with cleavage of the ring.

These compounds can be prepared by the method described for the production of glycol phosphorous chloride and further reaction of the cyclic phosphorous chloride with alcohols, mercaptans or amines by known methods for the reaction of a phosphorous chloride with these substances.

The reaction between the cyclic phosphites and α-halogenated aldehydes proceeds according to the following equation:

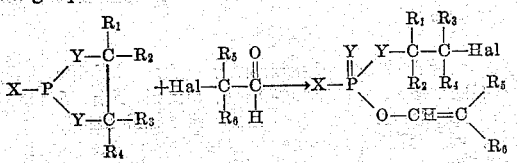

In these formulae X, Y and $R_1$ thru $R_6$ have the significance indicated in the first formula.

Suitable cyclic phosphates are the compounds obtainable from ethylene glycol, propylene glycol, butylene glycols, hydrobenzoine, thioglycol, thiodiglycol etc. Aldehydes which are suitable are e.g. chloro-acetaldehyde, dichloro-acetaldehyde, chloral, bromo-acetaldehyde, dibromo-acetaldehyde, bromal, α-chloro-propionaldehyde, α-dichloro-propionaldehyde, α-chlorobutyricaldehyde, α-bromobutyric aldehyde etc.

The reaction, which generally takes place with the formation of good yields, is surprising and could not in any way be anticipated. The operable reaction temperatures are from about 20 to about 100° C. In many cases, the reaction proceeds so violently when the components are brought together that cooling is necessary. The reaction can, however, also be retarded, depending on the nature of the reactants. Even when this is done, however, it is possible to cause the reaction to take place by heating the reactants for a short time to 60–70° C. Preferably, molar proportions of the reactants are employed. However, one or the other of the reactants may also be used in excess.

Inert solvents can be used for moderating the reaction. Hydrocarbons, for example benzene and toluene, have been found suitable as such solvents.

The substances which can be obtained by means of the novel process show strong insecticidal properties and can consequently be used as pest-control agents; they can also be used as intermediates in the preparation of pharmaceutical preparations.

Example 1

29 gm. of glycol phosphorous acid ethyl ester (B.P. 12 mm. 52° C.) are diluted with 29 cc. of toluene. 30 gm. of chloral are then added at 50–60° C. while stirring. The product obtained after the reaction subsides is distilled, and there are obtained 35 g. of O-β-chlorethyl-O-β,β-dichlorvinyl-O-ethyl phosphate (B.P. 2/136° C.). The product has an excellent effect against flies and also against aphids.

Example 2

34 gm. of glycol phosphorous acid-β-chlorethyl ester (B.P. 9/91°) are diluted with 50 cc. of toluene. 30 gm. of chloral are added at 65° C. while stirring and this temperature is maintained for one hour. By fractional distillation of the liquid which is formed, there are obtained 55 g. of O,O-di-β-chlorethyl-O-β,β-dichlorvinyl phosphate (B.P. 2 mm. 169° C.). The novel product shows good insecticidal properties against flies and aphids.

Example 3

57 gm. of glycol phosphorous acid-n-hexyl ester (B.P. 2 mm. 80° C.), are diluted with 100 cc. of benzene, and then 64 gm. of chloral are added dropwise at 65° C. The temperature is maintained at this level for a further half an hour and then the product is fractionated. 83 gm. of O-β-chlorethyl-O-β,β-dichlorvinyl-O-n-hexyl phosphate are obtained.

Example 4

48 gm. of glycol phosphorous acid-β,β-β-trichlorethyl ester (B.P. 2 mm. 79° C.) are mixed with 30 gm. of chloral at 60° C. while stirring. This temperature is maintained for a further half an hour, and then the product is heated under high vacuum to 70° C. in 10 minutes at a pressure of 2 mm. of mercury in order to remove all volatile constituents. 55 gm. of O-β-chlorethyl-O-β,β,β-trichlorethyl-O-β,β-dichlorvinyl phosphate are obtained. The novel esters can not be distilled below a pressure of 2 mm.

Example 5

76 gm. of glycol phosphorous acid-2,4-dichlorphenyl ester (B.P. 2 mm. 135° C.) are mixed with 45 gm. of chloral at 70° C. while stirring. The indicated temperature is maintained for one hour and then the product is heated for a short time under high vacuum as in Example 4. 45 gm. of O-β-chlorethyl-O-β,β-dichlorvinyl-O-2,4-dichlorphenyl phosphate are obtained as an oily product which cannot be distilled.

Example 6

Under similar conditions to those indicated in Example 5, the following compound

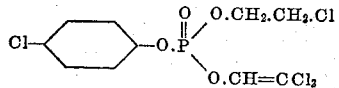

can be obtained from glycol phosphorous acid-4-chlorphenyl ester (B.P. 2/110° C.).

Example 7

28 gm. of glycol phosphorous acid methyl thiolester (B.P. 14/78–79° C.) are dissolved in 30 cc. of benzene. 30 gm. of chloral are added at 40° C. while stirring and this temperature is maintained for half an hour. By fractionation, there are obtained 30 gm. of O-β-chlorethyl-O-β,β-dichlorvinyl-S-methyl thiol phosphate with a B.P. of 138° C. at 3 mm. The novel compound shows a good action against flies.

Example 8

It is possible in analogous manner to obtain the following compound

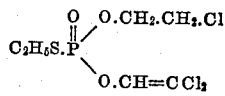

B.P. 2/134° C. The novel compound is found to be very effective against aphids and red spiders.

Example 9

29 gm. of glycol phosphorous acid phenyl thiolester (B.P. 2 mm. 123° C.) are dissolved in 40 cc. of toluene. 22 gm. of chloral are added at 64° C. while stirring and the mixture heated for another hour at 70° C. After fractionation, there are obtained 37 gm. of the β-chlorethyl-β,β-dichlorvinyl ester of phenyl thiolphosphoric acid (B.P. 2 mm. 174° C.)

Example 10

27 gm. of glycol phosphorous dimethyl amide (B.P. 12 mm. 65° C.) are dissolved in 100 cc. of toluene. 30 gm. of chloral are added dropwise at 50° C. while stirring, and this temperature is maintained for another 10 minutes. By distillation, there are obtained 35 gm. of O-β-chlorethyl - O - β,β - dichlorvinyl-phosphoric acid dimethyl amide (B.P. 2 mm. 137° C.). The novel product shows a good action against aphids.

Example 11

46 gm. of glycol phosphorous acid methylester (B.P. 13 mm. Hg=43° C.) are dissolved in 150 ccm. of benzene. 55.5 g. of freely distilled chloral are added slowly. The addition of chloral begins at 20° C. and care has to be taken that the temperature does not rise above 70–75° C. While stirring the reaction mass cools down. After fractionation, there are obtained 13 g. of the O-β-chlorethyl - O - β,β - dichlorvinyl - O - methyl - phosphate (B.P. 0.01 mm. Hg 65–66° C., colorless, water insoluble, oily liquid).

These vinyl-phosphates may be employed in controlling many types of insects and mites such as, for example, the black bean aphid, green peach aphid, pea aphid, chrysanthemum aphid, greenhouse thrips, California red scale, citrus red spider, greenhouse red spider, milkweed bug, mealy bug, sow bug, German cockroach, southern army worm, yellow fever mosquito, malarial mosquito, Mexican bean beetle, confused flour beetle, and black carpet beetle.

The new compounds may also be used in combination with insecticides such as lead arsenate, nicotine, rotenone, pyrethrum, benzene hexachloride, 1,1,1-trichloro-2,2-di-(p-chlorophenyl)-ethane, dodecyl thiocyanate, phenothiozine, and the like; with fungicides such as sulfur, various copper compounds, mercury salts, and the like; and with various types of plant foods and fertilizers. They may further be used together with the so-called "Aroclors" which improve their insecticidal properties. Furthermore any suitable solid or liquid carriers may be used in applying these new phosphates. Suitable solid carriers are e.g. talcum, the bentonites, chalk etc. Liquid carriers may be any suitable solvent like water, alcohols, hydrogenated, unsaturated or halogenated hydrocarbons etc. If necessary the new compounds, if applied in liquid suspensions, may be used with any suitable emulsifier.

While the invention has been described with particular reference to specific embodiments, it is to be understood that it is not to be limited thereto, but is to be construed broadly and restricted solely by the scope of the appended claim.

I claim:

O-β-chloroethyl-O-β,β-dichlorvinyl-O-methyl-phosphate.

References Cited in the file of this patent

UNITED STATES PATENTS

| | | |
|---|---|---|
| 2,631,162 | Ladd et al. | Mar. 10, 1953 |
| 2,744,128 | Morris et al. | May 1, 1956 |
| 2,765,331 | Whetstone et al. | Oct. 2, 1956 |
| 2,861,912 | Sallmann | Nov. 25, 1958 |

OTHER REFERENCES

Chem. Abstr., 1948, 4932–4934.

Kosolapoff: Organo-Phosphorus Compounds, 1950, pp. 197–198.

Allen et al.: "J. Am. Chem. Soc.," 77, pp. 2871–2875 (May 20, 1955).